A. S. Wilkinson,
Horseshoe.

Nº 61,975. Patented Feb. 12, 1867.

Witnesses,
George W. Rothwell,
Thomas J. Hurdle

Inventor;
Munn and Co
Attorneys for
A. S. Wilkinson
By O. Knight
Supt

United States Patent Office.

ALBERT S. WILKINSON, OF PAWTUCKET, RHODE ISLAND.

Letters Patent No. 61,975, dated February 12, 1867.

IMPROVEMENT IN HORSE-SHOES.

The Schedule referred to in these Letters Patent and making part of the same.

TO ALL WHOM IT MAY CONCERN:

Be it known that I, ALBERT S. WILKINSON, of Pawtucket, in the county of Providence, and State of Rhode Island, have invented a new and useful Improvement in Calks for Horse-Shoes; and I do hereby declare the following to be a full, clear, and exact description of the same sufficient to enable one skilled in the art to which the invention appertains to make use of it, reference being had to the accompanying drawings, which form a part of this specification, in which—

This invention relates to new and useful improvements in calks for shoes of horses and other animals, as hereinafter explained.

Figure 1:
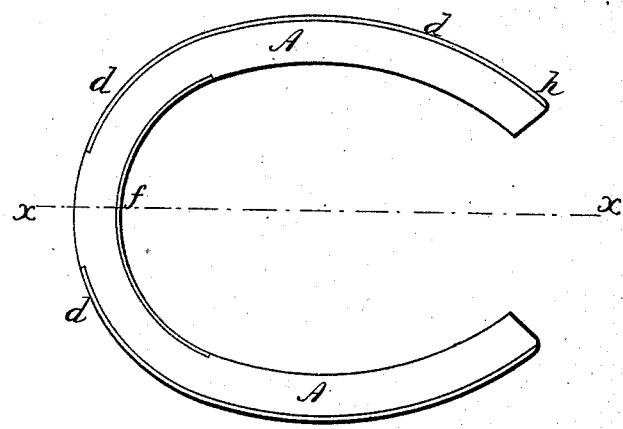
Figure 1 is a bottom view of my improved shoe.
Figure 2:
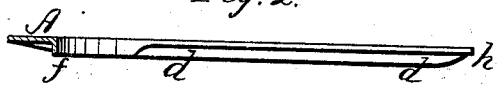
Figure 2 is a cross-section in the line $x$ $x$ of fig. 1.

A, fig. 1, in the accompanying plate of drawings, is a light racing horse-shoe. $d$ $d$ are calks which surround the outer edge of the shoe, excepting at the toe, where a break is made, as clearly shown in fig. 1. $f$ is another calk placed on the inner edge of the shoe opposite the opening or break in the outer calk, $d$ $d$. This method of arranging the calks, it will be seen, gives the rolling form of toe, a great desideratum in horse-shoes. The rear termination of the sections $d$ $d$ of the calks, fig. 2, are rounded up so as to give in a measure round heels to the shoe, as shown at $h$ $h$. This shoe, when made of sheet metal, may be cut out and stamped or swaged into shape with great readiness.

Having thus described my invention, what I claim as new, and desire to secure by Letters Patent, is—

A calk formed by parts $d, f, d$, placed alternately on the outer and inner edge of the bar A, substantially as shown and described.

ALBERT S. WILKINSON.

Witnesses:
    E. P. PATERSON,
    W. W. BLADGETT.